(12) United States Patent
Kim (10) Patent No.: US 9,799,895 B2
(45) Date of Patent: Oct. 24, 2017

(54) STACK FASTENING STRUCTURE OF FUEL CELL

(71) Applicant: Hyundai Motor Company, Seoul (KR)

(72) Inventor: Jung Ik Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 14/727,937

(22) Filed: Jun. 2, 2015

(65) Prior Publication Data

US 2016/0149252 A1  May 26, 2016

(30) Foreign Application Priority Data

Nov. 21, 2014  (KR) .......................... 10-2014-0163620

(51) Int. Cl.
*H01M 8/24* (2016.01)
*H01M 8/02* (2016.01)
*B60L 11/18* (2006.01)

(52) U.S. Cl.
CPC ........... *H01M 8/02* (2013.01); *B60L 11/1883* (2013.01); *H01M 2250/20* (2013.01); *Y02P 70/56* (2015.11); *Y02T 90/32* (2013.01)

(58) Field of Classification Search
CPC ...... H01M 8/248; H01M 8/02; H01M 8/2415; H01M 8/2475; H01M 8/2485
See application file for complete search history.

(56) References Cited

U.S. PATENT DOCUMENTS

| 7,776,489 B2 | 8/2010 | Kum et al. | |
| 2002/0034673 A1* | 3/2002 | Bisaka | H01M 8/248 429/454 |
| 2005/0277012 A1* | 12/2005 | Inagaki | H01M 8/247 429/470 |
| 2006/0240307 A1* | 10/2006 | Suh | H01M 8/248 429/469 |
| 2007/0207358 A1* | 9/2007 | Obika | H01M 8/02 429/465 |
| 2009/0226794 A1* | 9/2009 | Kum | H01M 8/248 429/463 |
| 2010/0092839 A1* | 4/2010 | Kaupert | H01M 8/2475 429/470 |

(Continued)

FOREIGN PATENT DOCUMENTS

| JP | 2010-157364 A | 7/2010 |
| JP | 2011-124130 A | 6/2011 |

(Continued)

OTHER PUBLICATIONS

Notice of Allowance dated Mar. 16, 2017 in corresponding Korean application KR 10-2014-0163620.

*Primary Examiner* — Imran Akram
(74) *Attorney, Agent, or Firm* — Mintz Levin Cohn Ferris Glovsky and Popeo, P.C.; Peter F. Corless (57) ABSTRACT

A stack fastening structure of a fuel cell is provided and includes a fastening mechanism that is mounted at an outside of a plurality of stacked fuel cells to generate a force pressing against the plurality of stacked fuel cells. In addition, an insertion body is mounted within the fastening mechanism to adjust the force pressing against the plurality of fuel cells. Accordingly, the fastening force is more accurately adjusted using the insertion body and the external force applied to the insertion body is measured to calculate the fastening force.

11 Claims, 8 Drawing Sheets

(56) References Cited

U.S. PATENT DOCUMENTS

| | | | |
|---|---|---|---|
| 2010/0291458 A1* | 11/2010 | Takeyama | H01M 8/2485 |
| | | | 429/458 |
| 2011/0143251 A1 | 6/2011 | Morimoto et al. | |
| 2012/0028135 A1* | 2/2012 | Ohashi | B62D 25/20 |
| | | | 429/400 |
| 2015/0270562 A1* | 9/2015 | Naito | H01M 8/04201 |
| | | | 429/458 |
| 2016/0172703 A1* | 6/2016 | Horlock | H01M 8/2415 |
| | | | 429/456 |
| 2016/0226084 A1* | 8/2016 | Itoga | H01M 8/04 |

FOREIGN PATENT DOCUMENTS

| | | |
|---|---|---|
| JP | 2012-028194 A | 2/2012 |
| KR | 10-0666782 B1 | 1/2007 |
| KR | 10-0884206 B1 | 2/2009 |
| KR | 10-2009-0094905 A | 9/2009 |

* cited by examiner

STACK FASTENING STRUCTURE OF FUEL CELL

CROSS-REFERENCE TO RELATED APPLICATION

This application is based on and claims the benefit of priority to Korean Patent Application No. 10-2014-0163620, filed on Nov. 21, 2014 in the Korean Intellectual Property Office, the disclosure of which is incorporated herein in its entirety by reference.

TECHNICAL FIELD

The present disclosure relates to a stack fastening structure of a fuel cell, and more particularly, to a stack fastening structure of a fuel cell that measures a fastening force when the fuel cell stack is fastened and more accurately adjusts the fastening force applied to the fuel cell stack.

BACKGROUND

A fuel cell stack is configured to include a plurality of stacked fuel cells and a fastening mechanism for electrically connecting therebetween and maintaining air tightness therein (e.g., a seal). In particular, when an applied fastening force is too strong, damage may be caused to an inside of a fuel cell and when the applied fastening force is too weak, it may be difficult to obtain required air tightness and electrical connection. Therefore, there is a need to apply an appropriate fastening force.

Figure 1:
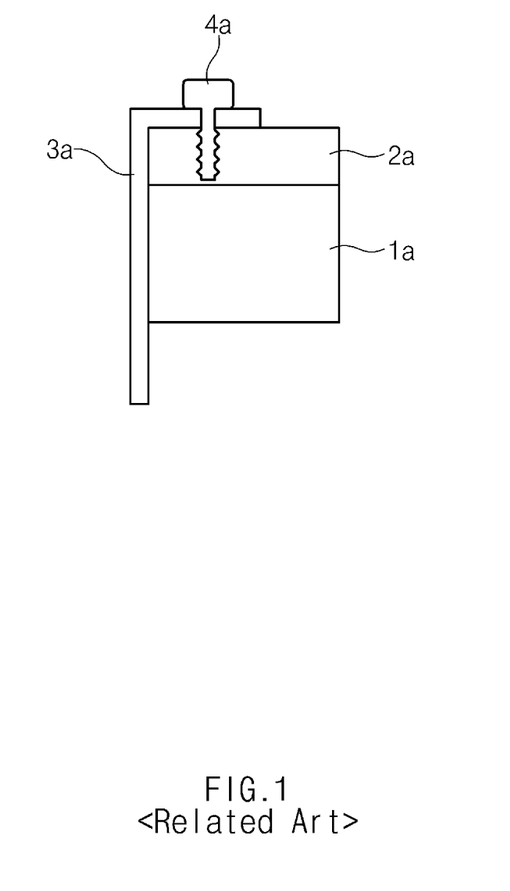
FIG. 1 is an exemplary cross-sectional view of main parts of a stack fastening structure of a fuel cell according to the related art.

FIG. 1 illustrates the existing stack fastening structure in which an end plate 2a is disposed within a fuel cell stack 1a to apply the fastening force to a fuel cell stack 1a and a fixed fastening band 3a is fastened with the end plate 2a by a bolt 4a. As illustrated in FIG. 1, the existing stack fastening structure is not adjustable in length based on a dimension deviation of components in the fuel cell, such as a gas diffusion layer or a gasket, and when the fastening force is reduced due to the long-term use, it may be difficult to compensate for the fastening force unless the fuel cell stack 1a is disassembled and then an insertion body is inserted thereinto or the fastening band 3a manufactured at different dimensions is replaced.

Instead of the fastening band 3a, a bolt that penetrates through the fuel cell stack 1a and a combination of a nut coupled with the bolt may adjust the fastening force applied to the fuel cell stack. However, when a pitch of a thread formed in the used bolt 4a is too large, it may be difficult to finely adjust the fastening force and to quantitatively determine the fastening force when the fuel cell stack 1 is fastened.

Figure 2:
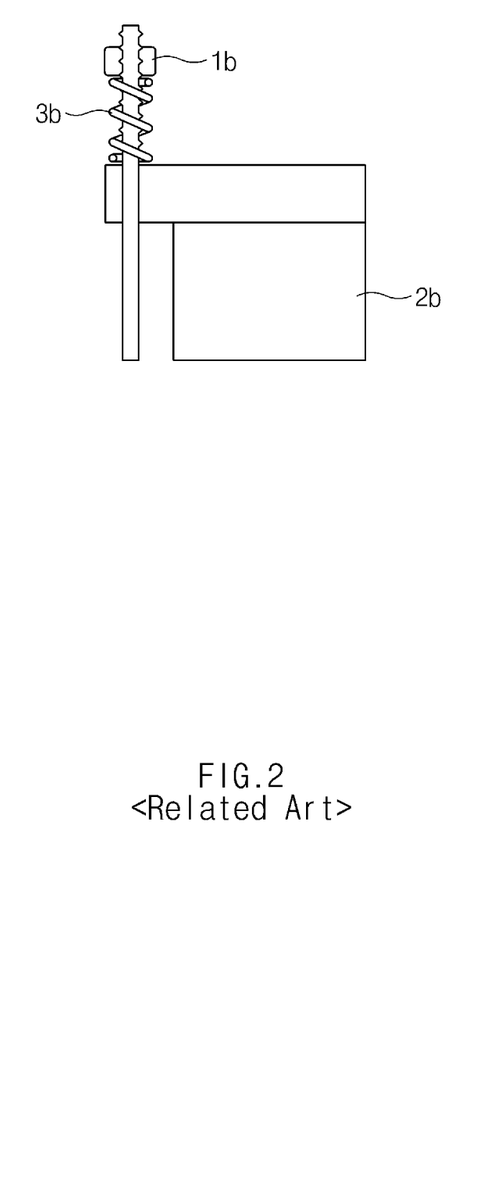
FIG. 2 is an exemplary cross-sectional view of main parts of the stack fastening structure of a fuel cell including an elastic body to measure a fastening force according to the related art.

FIG. 2 illustrates an elastic body 3b inserted between the fastening mechanism 1b and the stack 2b to measure the fastening force according to the related art. As illustrated in FIG. 2, the elastic body 3b is inserted between the fastening mechanism 1b and the stack 2b to measure a compressed length of the elastic body 3b, thereby measuring the fastening force. However, considering that the applied fastening force per one fastening band is generally 500 to 600 kgf, a change in the length of the elastic body 3b based on a change in the fastening force is minimal, and as a result, it may be difficult to measure the change in the length of the elastic body 3b.

For example, when the elastic body having a modulus of elasticity of 10 kgf/mm is used, since an original length of the elastic body 3b is equal to or more 50 mm, a length of the fastening mechanism 1b is too large, and as a result, it is difficult to be mounted. On the other hand, the elastic body 3b having a modulus of elasticity of 500 kgf/mm has a changed length as much as 0.02 mm when the modulus of elasticity is changed as much as 10 kgf, and as a result, it is difficult to be mounted.

SUMMARY

The present disclosure provides a stack fastening structure of a fuel cell that measures a fastening force when the fuel cell stack is fastened and more accurately adjusts the fastening force applied to the fuel cell stack.

According to an exemplary embodiment of the present disclosure, a stack fastening structure of a fuel cell may include: a fastening mechanism mounted at an outside of a plurality of stacked fuel cells to generate a force pressing the plurality of stacked fuel cells; and an insertion body mounted in the fastening mechanism to adjust the force.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described in detail with reference to the accompanying drawings.

As illustrated in FIGS. 3 to 10, a stack fastening structure of a fuel cell 300 according to an exemplary embodiment of the present disclosure may include an end plate 110 attached to the plurality of stacked fuel cells 300 and a fastening band 120 fastened with the end plate 110 to press against the plurality of fuel cells 300, in which the end plate 110 may have an inclined surface 111 and an insertion body 200 moving along the inclined surface 111 may be interposed between the end plate 110 and the fastening band 120.

The insertion body 200 may include an inclined bottom surface 210 formed to have the about same angle as an inclined angle of the inclined surface 111 and may contact (e.g., abut) the inclined surface 111. The end plate 110 may include a transfer device 114 configured to apply an external force to the insertion body 200 in a direction horizontal to the end plate 110. The insertion body 200 thus is moved along the inclined surface 111 by the external force transferred through the transfer device 114. The transfer device 114 may include an elastic body 115 provided to elastically support the insertion body 200. A variation of the fastening force generated between the end plate 110 and the fastening band 120 may be calculated based on a length variation of the elastic body 115 and an inclination of the inclined surface 111.

Figure 3:
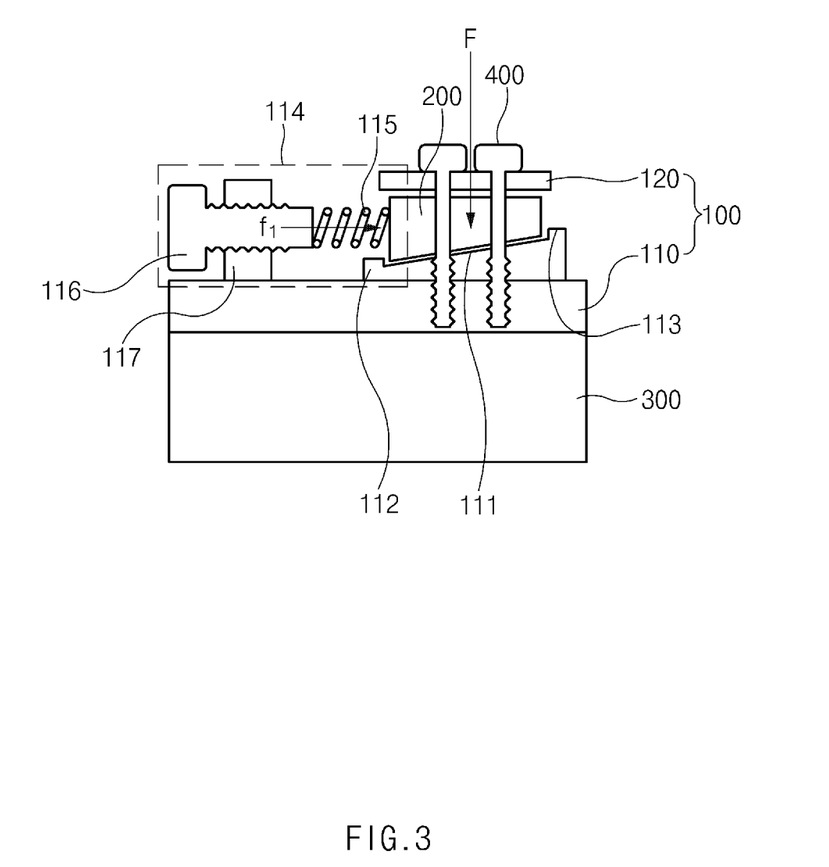
FIG. 3 is an exemplary cross-sectional view of main parts of a stack fastening structure of a fuel cell according to an exemplary embodiment of the present disclosure.
Figure 4:
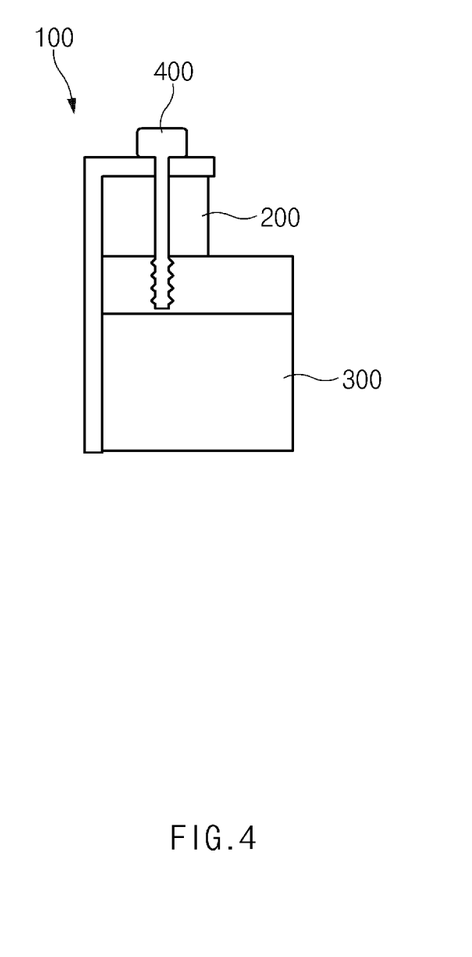
FIG. 4 is another exemplary cross-sectional view of main parts of the stack fastening structure of a fuel cell of FIG. 3 according to an exemplary embodiment of the present disclosure.
Figure 5:
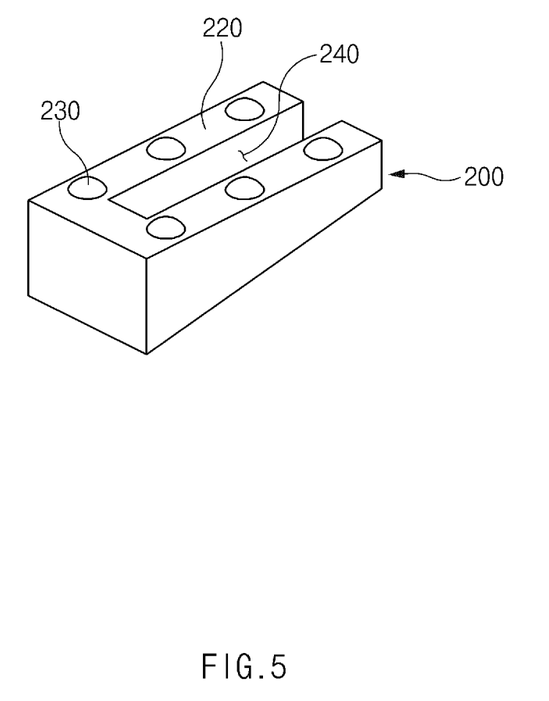
FIG. 5 is an exemplary perspective view of an insertion body included in the stack fastening structure of a fuel cell of FIG. 3 according to an exemplary embodiment of the present disclosure.

The stack fastening structure of a fuel cell 300 will be described in more detail below. The stack fastening structure of a fuel cell 300 according to the exemplary embodiment of the present disclosure may include a fastening mechanism 100 mounted at an outside of (e.g., extraneous to) the plurality of fuel cells 300 to generate a force pressing against the plurality of stacked fuel cells 300 and the insertion body 200 mounted within the fastening mechanism 100 to adjust the force pressing the plurality of fuel cells 300.

The fastening mechanism 100 may include the end plate 110 mounted in the plurality of fuel cells 300 to be horizontal to the fuel cells 300 and the fastening band 120 enclosing the plurality of fuel cells 300 and fastened with the end plate 110, in which the insertion body 200 may be interposed in a fastened portion between the end plate 110 and the fastening band 120. Further, the end plate 110 may include the inclined surface 111 inclined to form a predetermined angle relative to the fuel cell 300 and may contact (e.g., abut) the insertion body 200 and the transfer device 114 provided at one side (e.g., a first side) of the inclined surface 111 to press the insertion body 200 in a horizontal direction toward the fuel cell 300. The inclined surface 111 may include a plurality of protrusions 112 and 113 which limit a moving distance of the insertion body 200. Additionally, the transfer device 114 may include the elastic body 115 that elastically supports the insertion body 200.

According to the exemplary embodiment of the present disclosure, the transfer device 114 may further include a protruding body 117 that protrudes vertically from the end plate 110 and a adjusting screw 116 configured to be screw-coupled with the protruding body 117, in which the adjusting screw 116 may be attached with a spring as the elastic body 115. In particular, the spring may be attached to one side of the insertion body 200. In other words, the insertion body 200 and the adjusting screw may be connected via the spring.

The insertion body 200 may be a solid object in which the inclined bottom surface 210 having the about same angle as the inclined surface 111 and a horizontal upper surface 220 contacting the fastening band 120 may be formed. The inclined bottom surface 210 and the horizontal upper surface 220 may include a friction reducing member 230 to minimize a contact friction between the end plate 110 and the fastening band 120. The friction reducing member 230 may be a plurality of balls mounted on the inclined bottom surface 210 or the horizontal upper surface 220.

In particular, for the friction reducing member 230, a cylindrical roller may be mounted on the inclined bottom surface 210 or the horizontal upper surface 220 instead of a ball and lubricating oil may be applied thereto. Further, frictionless coating may be applied on the insertion body 200, the end plate 110, and the fastening band 120. According to the exemplary embodiment of the present disclosure, for the friction reducing member 230, the plurality of balls may be mounted on the inclined bottom surface 210 and the horizontal surface.

A dimensional deviation of the insertion body 200 due to a clearance between the balls, a processing error of the balls, and the like which may be generated during the manufacturing process of the insertion body 200 may be compensated for by moving an initial position of the insertion body 200 left and right during the stack fastening process and therefore does not affect the fastening force to be adjusted after the fastening.

In other words, after the fastening is completed, the fastening force applied to the insertion body 200, the elastic body 115, and the fastening band 120 may be determined by the length of the elastic body 115 and may not be affected by a processing error of other parts or the clearance between the parts. As a result, when a size of a repulsive force based on the length of the elastic body 115 is more accurately determined, the variation of the fastening force may be measured by measuring the length of the elastic body 115 after the stack is fastened. In other words, it may be possible to more accurately adjust the fastening force by more accurately measuring the size of the fastening force applied to the stack and operating the transfer device 114.

Figure 6:
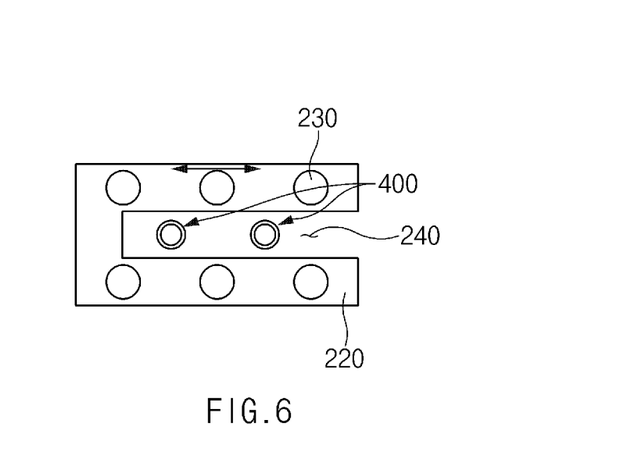
FIG. 6 is an exemplary plan view of the insertion body included in the stack fastening structure of a fuel cell of FIG. 3 according to an exemplary embodiment of the present disclosure.
Figure 7:
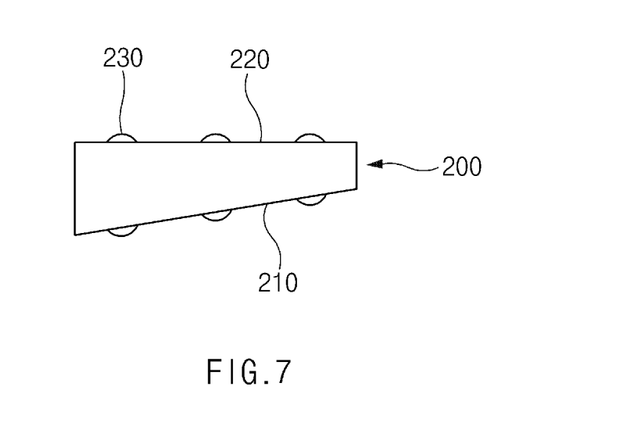
FIG. 7 is an exemplary front view of the insertion body included in the stack fastening structure of a fuel cell of FIG. 3 according to an exemplary embodiment of the present disclosure.
Figure 8:
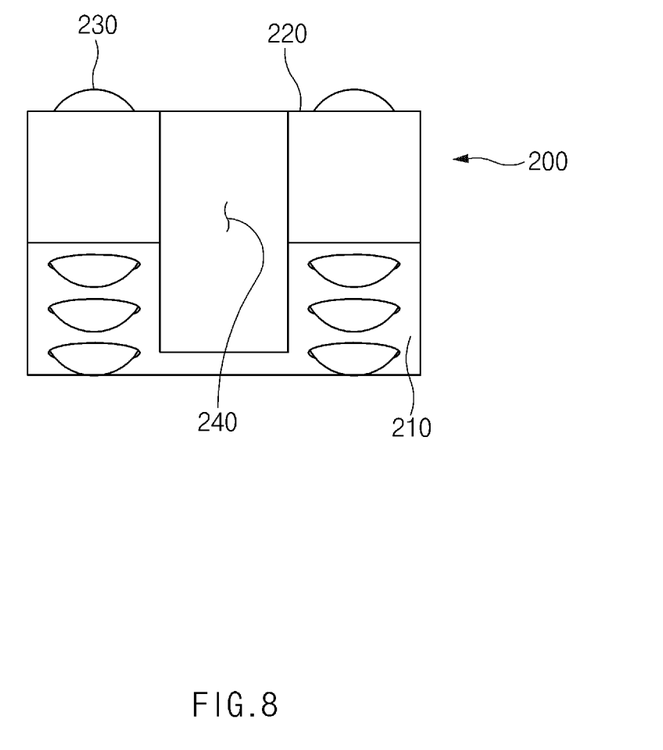
FIG. 8 is an exemplary side view of the insertion body included in the stack fastening structure of a fuel cell of FIG. 3 according to an exemplary embodiment of the present disclosure.
Figure 9:
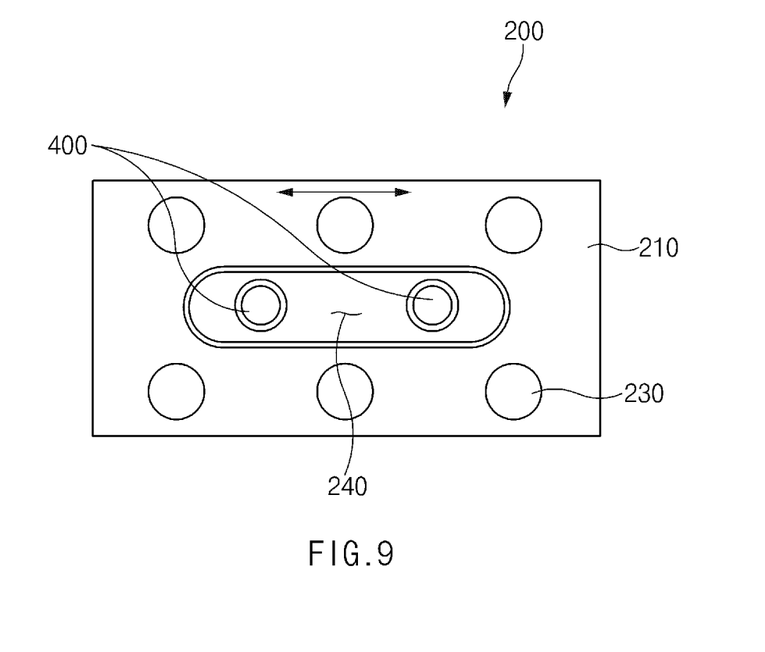
FIG. 9 is another exemplary plan view of the insertion body included in the stack fastening structure of a fuel cell of FIG. 3 according to an exemplary embodiment of the present disclosure.
Figure 10:
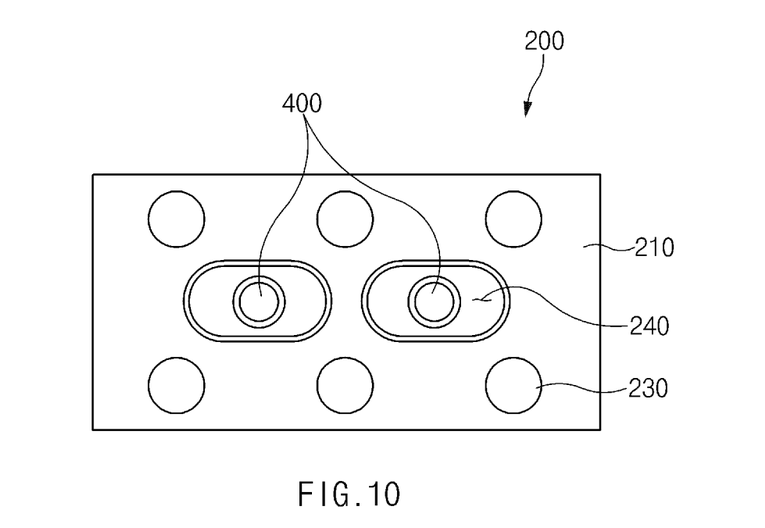
FIG. 10 is still another exemplary plan view of the insertion body included in the stack fastening structure of a fuel cell of FIG. 3 according to an exemplary embodiment of the present disclosure.

Furthermore, the end plate 110 and the fastening band 120 may be screw-coupled via a fixed bolt 400. Meanwhile, the insertion body 200 may include an aperture 240 through which the fixed bolt 400 may penetrate (e.g., be inserted). As illustrated in FIG. 6, the aperture 240 may be cut inwardly from one side of the insertion body 200. Alternatively, as illustrated in FIG. 9 or 10, the aperture 240 may be formed to penetrate through the inclined bottom surface 210 from the horizontal upper surface 220 of the insertion body 200.

When the insertion body 200 moves by being applied with a lateral force from the elastic body 115 due to the aperture 240, the insertion body 200 may freely move without being restricted to the bolt which fixes the fastening band 120 and the end plate 110. A shape of the aperture 240 may be determined by considering a moving distance of the insertion body 200 which is required during the adjusting of the number of bolts, an interval between the bolts, and the fastening force.

The present disclosure configured as described above may increase or reduce the fastening force while the insertion body 200 moves along the inclined surface 111 by an inclined plane effect. The transfer device 114 may change the height of the insertion body 200 along the inclined surface 111 to precisely control the fastening force.

A more detailed description thereof will be provided below. Since the height of the insertion body 200 may be different based on the inclined bottom surface 210, when the insertion body 200 ascends along the inclined surface 111 from the initial position, a tension force may be generated between the end plate 110 and the fastening band fastened by the bolt and thus the fastening force may increase. Further, when the insertion body 200 descends along the inclined surface 111 from the initial position, a space may be generated between the end plate 110 and the fastening band fastened by the bolt to reduce the fastening force.

Meanwhile, as described above, the transfer device 114 may include the elastic body 115 which elastically supports the insertion body 200 and therefore the variation of the fastening force based on the change in the height of the insertion body 200 may be calculated based on the change in the length of the elastic body 115. For example, the slope of the inclined surface 111 is about 10° and the end plate 110 and the fastening band 120 may be fastened via the bolt, and thus when the fastening force applied to the stack of the fuel cell 300 is about 500 kgf, the lateral force transferred to the transfer device 114 is about 88 kgf. When the fastening force is changed as much as about 10 kgf, the lateral force is changed as much as about 1.8 kgf. The lateral force is obtained based on the following Equation 1.

$$f(\text{lateral force}) = F(\text{fastening force}) \times \tan(t), \text{ wherein } t = \text{angle of inclined surface} \quad \text{Equation 1}$$

Therefore, when the elastic body 115 having the modulus of elasticity of about 5 kgf/mm is provided in the transfer device 114, the length of the elastic body 115 may be changed by about 0.36 mm in the initial state and therefore the change in the fastening force may be sensed by measuring the change in the length of the elastic body 115.

As described above, according to the stack fastening structure of a fuel cell according to the exemplary embodiments of the present disclosure, it may be possible to more accurately adjust the fastening force using the insertion body and measure the external force applied to the insertion body to calculate the fastening force.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A stack fastening structure of a fuel cell, comprising:
   a fastening mechanism mounted at an outside of a plurality of stacked fuel cells configured to generate a force pressing against the plurality of stacked fuel cells;
   an insertion body mounted in the fastening mechanism configured to adjust the force pressing against the plurality of stacked fuel cells;
   an end plate of the fastening mechanism mounted with the plurality of fuel cells, wherein the end plate has an inclined surface formed on an upper side of the end plate and abutting the insertion body; and
   a transfer device including an elastic body that elastically supports the insertion body, a protruding body that protrudes in a stacking direction toward the outside from the end plate, and an adjusting screw configured to be screw-coupled with the protruding body,
   wherein the adjusting screw is attached with the elastic body.

2. The stack fastening structure according to a fuel cell of claim 1, wherein the fastening mechanism includes:
   a fastening band configured to enclose the plurality of fuel cells and fastened with the end plate,
   wherein the insertion body is interposed in a fastened portion between the end plate and the fastening band.

3. The stack fastening structure according to a fuel cell of claim 1, wherein the inclined surface includes a protrusion which limits a moving distance of the insertion body.

4. The stack fastening structure according to a fuel cell of claim 1, wherein the insertion body is a solid object in which an inclined bottom surface having the about same angle as the inclined surface and a horizontal upper surface contacting the fastening band are formed.

5. The stack fastening structure according to a fuel cell of claim 4, wherein the inclined bottom surface and the horizontal upper surface include a friction reducing member to minimize a contact friction between the end plate and the fastening band.

6. The stack fastening structure according to a fuel cell of claim 5, wherein the friction reducing member is a plurality of balls mounted on the inclined bottom surface or the horizontal upper surface.

7. The stack fastening structure according to a fuel cell of claim 5, wherein the friction reducing member is a plurality of cylindrical rollers mounted on the inclined bottom surface or the horizontal upper surface.

8. The stack fastening structure according to a fuel cell of claim 5, wherein the friction reducing member is a lubricating oil applied to the inclined bottom surface or the horizontal upper surface.

9. The stack fastening structure according to a fuel cell of claim 4, wherein the end plate and the fastening band are screw-coupled with each other by a fixed bolt, and the insertion body includes an aperture through which the fixed bolt penetrates to measure and adjust a fastening force.

10. A stack fastening structure of a fuel cell, comprising:
   an end plate attached to a plurality of stacked fuel cells, the end plate having an inclined surface formed on an upper side of the end plate;

a fastening band fastened with the end plate to press against the plurality of fuel cells;
an insertion body configured to move along the inclined surface, the insertion body being interposed between the end plate and the fastening bad; and
a transfer device including an elastic body that elastically supports the insertion body, a protruding body that protrudes in a stacking direction toward an outside from the end plate, and an adjusting screw configured to be screw-coupled with the protruding body,
wherein the adjusting screw is attached with the elastic body.

11. The stack fastening structure according to a fuel cell of claim 10, wherein the insertion body includes an inclined bottom surface formed to have about the same angle as an inclined angle of the inclined surface and abuts the inclined surface.

\* \* \* \* \*